3,345,314
WATER-SOLUBLE NONCONJUGATED OIL-MODI-
FIED MALEIC ALKYD RESINS AND METHOD
OF PREPARING SUCH COMPOSITIONS
Edgar L. Clark, Oak Park, Ill., assignor to Commercial Solvents Chemical Corporation, a corporation of Maryland
No Drawing. Filed May 14, 1963, Ser. No. 280,447
8 Claims. (Cl. 260—22)

My invention relates to water-soluble alkyd resins useful as coating compositions and to a method of preparing such compositions.

Several methods have been previously suggested for making water-soluble alkyd resins. One such method involves dissolving a low viscosity alkyd resin having a comparatively high acid number in an ammonium hydroxide solution. Products of this type, however, when employed as a coating composition provide an extremely poor quality film. Also, such products have a tendency to give off ammonia fumes. Another difficulty connected with such products is that once applied as a coating composition they cannot be removed cleanly except by washing the surface with a strong caustic solution. Another method which has been suggested for producing water-soluble resins is to synthesize the resin in such manner as to provide it with a large number of polyethoxy groups per molecule. The presence of these polyethoxy groups adversely affect the employment of such a resin as a coating composition in that they tend to produce very soft films that cannot withstand scratching or abrasion.

I have found that the reaction product of a maleic alkyd resin base, modified with a nonconjugated oil and having free maleate groups, with an alkali metal bisulfite, e.g. sodium bisulfite, provides a resin that is soluble in water and which when applied to a surface in water solution dries to a hard, tough film similar to the film obtained from a conventional alkyd thinned with a hydrocarbon solvent. While the film provided by the resins of my invention is hard and tough, the film can be readily removed from the coated surface when desired merely by soaking in water.

The alkyd resin base employed to produce the water-soluble alkyds of my invention is a nonconjugated oil-modified maleic alkyd resin having free maleate groups. By free maleate groups, I mean that the alkyd has been esterified with maleic acid and that maleic ester groups are present but that they are not cross-linked, i.e. the double bond of the maleic acid is still present. Such alkyds are comparatively fluid and soft as compared to the hard maleic alkyds in which the maleic groups are fully reacted. The softness of the alkyd is advantageous in carrying out the reaction with sodium bisulfite as will be described more fully below. It is surprising that the soft alkyd, useless in itself for satisfactory film formation, is transformed into an alkyd with good film forming properties by the reaction with sodium bisulfite.

The alkyd resin base is prepared by reaction of maleic acid or anhydride with a polyhydric alcohol and a naturally occurring nonconjugated glyceride oil, or fatty acids derived from them. The polyhydric alcohol is preferably glycerol. Advantageously, a mixture of glycerol and triethylene glycol or diethylene glycol is used, the glycol assisting in providing a soft alkyd. The useful nonconjugated oils include, for example, linseed oil and soybean oil, or the fatty acids thereof. Conjugated oils, such as tung, oiticica and dehydrated castor oils, are not satisfactory for use because of their more rapid reaction rate. In the preparation of the alkyd bases there is a race between the rate of maleic esterification and the rate at which it adducts with the oil. Preferably, the alkyd base comprises the reaction product of maleic anhydride, glycerol, triethylene or diethylene glycol and a drying oil, such as linseed or soybean oil, and in amounts of about 15 to 24 weight percent maleic anhydride, 8 to 13 weight percent glycerol, 14 to 20 weight percent triethylene or diethylene glycol and 40 to 55 weight percent oil. The amounts of the constituents and reaction conditions are controlled to provide a comparatively fluid and soft alkyd containing free maleate groups. It is not necessary that all the maleate groups be free, but only that there are present sufficient free maleate groups to react with sufficient bisulfite to render the alkyd base water-soluble. Generally, about 14 to 18 weight percent of bisulfite reacted with, and based on, the alkyd base is sufficient to render the alkyd base water-soluble. The reaction is carried out by conventional methods, i.e. by heating the constituents until the desired acid number and viscosity are obtained. Preferably the oil and glycerol are admixed and heated followed by addition of the triethylene glycol and maleic anhydride. The temperature is generally within the range of 300° to 475° F. and the time of reaction about 6 to 9 hours.

The reaction of the alkyd base with the bisulfite is carried out with an aqueous solution of the bisulfite and at elevated temperature. It is necessary that the sodium bisulfite be present in aqueous solution in order to ionize the sodium bisulfite so that it will react with the alkyd base. It is believed that the bisulfite group reacts at the double bond of the free maleate groups. Since the presence of water presents the danger of reaction with and hydrolysis of the alkyd resin base, the reaction is carried out in minimum time to minimize this danger. The alkyd base and bisulfite are blended together intimately to assist in providing short reaction time. The softness of the alkyd base permits easier blending with the bisulfite. To assist further in the prevention of hydrolysis it is preferred that the reaction temperature employed be maintained at not more than about 250° F. Normally the reaction of the bisulfite and alkyd resin base is effected at a temperature in the range from about 80 to 250° F. While this reaction is conducted generally at an elevated temperature, it is not necessary to continue heating throughout the entire reaction since the initial stages of the reaction are slightly exothermic thus permitting a discontinuance of heating for a short period after the reaction mixture has been brought up to reaction temperature.

I have found that the presence of an organic solvent for the alkyd base in the reaction mixture facilitates the reaction of the bisulfite and alkyd resin base. The organic solvent acts as a coupling agent or co-solvent between the aqueous bisulfite phase and the resin phase. The preferred organic solvent is a lower aliphatic alcohol, e.g. isobutanol. Thus, it is preferred that the reaction be carried out with an aqeous solution of the bisulfite and a solution of the alkyd resin base in an organic solvent. The product of my invention is soluble in alcohols but insoluble in xylene and gasoline. It is also preferable to blow a stream of carbon dioxide through the reaction mixture after the reaction has been substantially completed in order to cool the reaction mixture and also to evoparate water and solvent present in the reaction mixture.

The products of my invention can be used as vehicles to prepare coating formulations, e.g. varnishes, paints, etc., by inclusion with suitable non-reactive pigments and water dispersible driers, in a manner known to the art. The products provide a hard film similar to that of a hydrocarbon solvent thinned varnish. The films formed by the composition of my invention are insoluble in ordinary moisture but can readily be removed from the coated surface by soaking in hot or cold water. In addition to providing a desirable hard film as a coating the resins of my invention also demonstrate excellent detergent qualities in that, after they have been removed from a surface, the previously coated surface is found to be cleaner than its initial state. Thus, the coating compositions of my invention are particularly desirable in floor coatings, for example, since they not only provide a hard film to protect the floor but provide the additional advantage of cleaning the floor when the coating is removed. Similarly, such coating compositions can be used to provide temporary protection for metal surfaces while in storage or transit. Due to the ease with which the coating compositions can be removed from surfaces they are also useful in compounding paints for temporary signs or children's paints. Furthermore, due to the insolubility of my resins in a great number of common organic compounds, such as xylene and gasoline, the resins of my invention are also useful for impregnation or coating of paper containers to provide the necessary oil resistance required in paint and lubricating oil containers.

My invention will be further illustrated by the following examples.

Example 1

An alkyd base was prepared by heating 880 gms. of linseed oil, 190 gms. of glycerine, and 1 gm. of lithium ricinoleate to a temperature of 470° F. and maintaining such temperature until the alkyd produced a clear solution in a 4:1 ratio in methanol. After cooling the mixture to 420° F., 330 gms. of triethylene glycol and 400 gms. of maleic anhydride were added. The reaction was continued until a cure time of 25 seconds obtained on a 392° F. cure plate. The resin was then cooled to 300° F. and reduced to 72% NV in isobutanol.

The alkyd resin base had the following properties:

Viscosity (Gardner-Holdt) _____ 1
Color (Gardner Hellige 1933) _____ 7
Acid number _____ 34
Non volatile matter, percent _____ 72
Solvent _____ Isobutanol After reduction of the resin base, a temperature of 90° F. was obtained and a solution of 280 gms. of sodium bisulfite in 420 gms. of water was added to the resin. A slow exothermic reaction carried the heat up to a temperature of 100° F. in the period of one hour. The reaction mixture was then heated until a clear solution was obtained at 180° F. A stream of carbon dioxide was then blown through the reaction mixture which was cooled to 120° F. The water soluble alkyd resin of my invention was removed from the reaction vessel. The carbon dioxide blowing removed 90 cc. of alcohol and 50 cc. of water from the reaction mixture.

Example 2

A sample of the product of Example 1 was dissolved in water to produce a 40% water solution. Water dispersible lead and cobalt driers were added to the water solution in the amount of 0.05% cobalt and 0.5% lead based on resin content and a film of this composition was cast on glass. The film set in 30 seconds and was dried overnight to produce a hard film similar to a standard mineral spirits alkyd.

After drying for 7 days, the film coated glass was immersed in cold water for 2 hours. The film was completely dissolved and left no debris or oily residue of any kind. After removal of the film, the surface of the previously coated glass was cleaner than it was prior to the application of the coating composition.

Example 3

An alkyd base was prepared by heating 850 gms. soybean oil, 210 gms. of glycerine and 1 gm. of lithium ricinoleate to 470° F. and holding for a clear solution. The mixture was then cooled to 410° F. and 260 gms. diethylene glycol and 400 gms. maleic anhydride were added. Reaction was continued at 350° to 400° F. until a cure time of 30 seconds on the 392° F. cure plate was obtained. The resin was cooled to 320° F. and reduced to 70% non-volatile content in Cellosolve.

After the solution was cooled to 95° F., a solution of 280 gms. of sodium bisulfite in 420 gms. of water was added. The mixture was gradually heated to 200° F. with good agitation for a period of two hours. The clear solution was then cooled as rapidly as possible to room temperature.

Example 4

A sample of the product of Example 3 was mixed with water to form a solution containing 40% solids. Water dispersible lead and cobalt driers were added in an amount equivalent to 0.5% lead and 0.05% cobalt metal based on resin content of the solution. A film was cast on glass which set in 25 minutes and dried overnight to a hard film.

After drying for 7 days, this film was easily removed by water in a manner similar to the film of Example 2.

I claim:
1. A water-soluble resinous coating composition which comprises the reaction product of an alkali metal bisulfite and a nonconjugated oil-modified maleic alkyd resin having free maleate groups.
2. A water-soluble resinous coating composition which comprises the reaction product of sodium bisulfite and a nonconjugated oil-modified maleic alkyd resin having free maleate groups, said alkyd resin comprising the reaction product of maleic anhydride, glycerol, triethylene glycol and linseed oil.
3. A water-soluble resinous coating composition which comprises the reaction product of sodium bisulfite and a nonconjugated oil-modified maleic alkyd resin having free maleate groups, said alkyd resin comprising the reaction product of maleic anhydride, glycerol, diethylene glycol and linseed oil.
4. A process for producing a water-soluble resinous coating composition which comprises reacting an aqueous solution of an alkali metal bisulfite with a nonconjugated oil-modified maleic alkyd resin having free maleate groups.
5. A process for producing a water-soluble resinous coating composition which comprises reacting an aqueous solution of sodium bisulfite with a solution of a nonconjugated oil-modified maleic alkyd resin in an organic solvent at a temperature of about 80 to 250° F., said alkyd resin comprising the reaction product of maleic anhydride, glycerol, triethylene glycol and linseed oil.
6. The process of claim 5 wherein the organic solvent is a lower aliphatic alcohol.
7. A process for producing a water-soluble resinous coating composition which comprises reacting an aqueous solution of sodium bisulfite with a solution of a nonconjugated oil-modified maleic alkyd resin in an organic solvent at a temperature of about 80 to 250° F., said alkyd resin comprising the reaction product of maleic anhydride, glycerol, diethylene glycol and linseed oil.
8. The process of claim 7 wherein the organic solvent is a lower aliphatic alcohol.

References Cited
UNITED STATES PATENTS

| | | | |
|---|---|---|---|
| 2,410,418 | 11/1946 | Auer | 200—22 |
| 2,455,743 | 12/1948 | Eilerman | 200—22 |
| 2,489,943 | 11/1949 | Wilson et al. | 200—75 |
| 2,981,706 | 4/1961 | Heinrich et al. | 260—22 |

DONALD E. CZAJA, *Primary Examiner.*

LEON J. BERCOVITZ, *Examiner.*

R. W. GRIFFIN, *Assistant Examiner.*